CLASSIFICATION
3063 X
87. PLOWS
(114) Plows
Stephen McCormick
Plough.
3063 X
2-3-1819
BEST AVAILABLE COPY
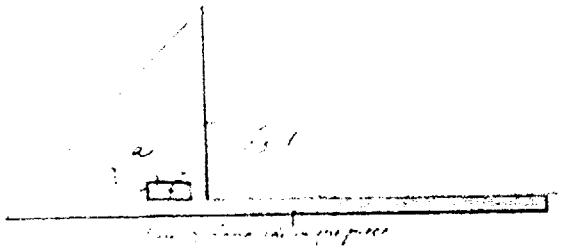
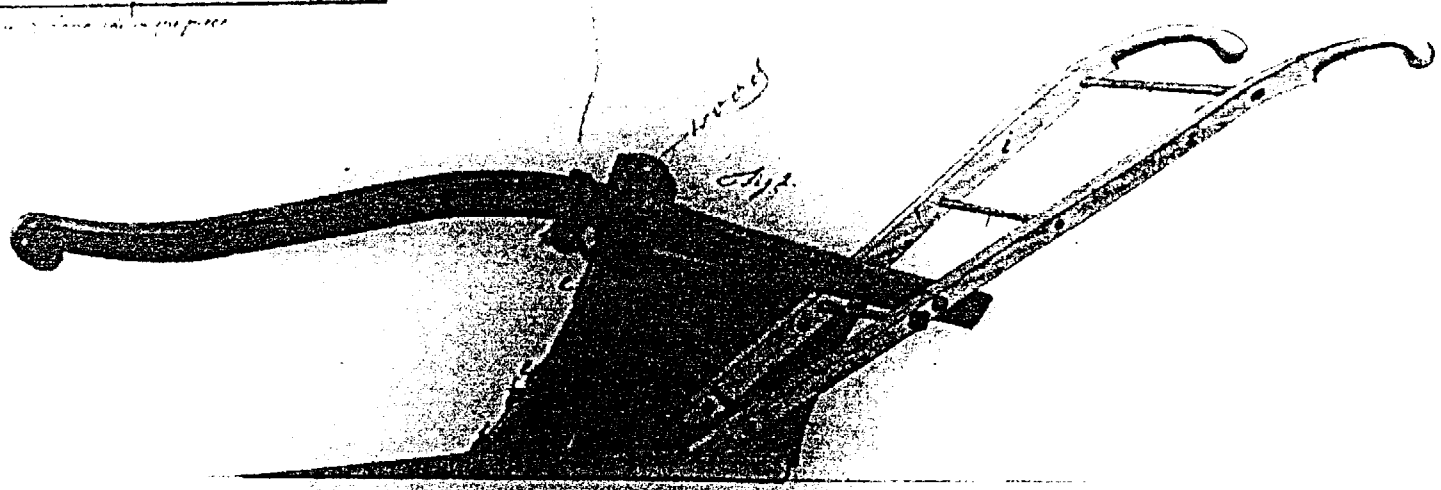
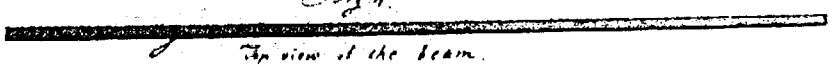
Fig 4.
Top view of the beam.

3063X

UNITED STATES PATENT OFFICE.

STEPHEN McCORMICK, OF FAUQUIER COUNTY, VIRGINIA.

IMPROVEMENT IN PLOWS.

Specification forming part of Letters Patent dated February 3, 1819.

*To all whom it may concern:*

Be it known that I, STEPHEN McCORMICK, of Fauquier county, Virginia, have invented an Improvement in Plows, of which the following is a specification.

This plow has a plate of wrought-iron added to a bar, which forms the landside, point, and share. There is a mortise-hole through the share, near the bar, to receive the sheath and brace.

The mold-board is made of cast-iron, and is so constructed as to fit on the share end. It has a perpendicular landside of ten inches or less, (agreeable to the size of the plow,) which has a shoulder that butts against the sheath. The front part of the mold-board has a gradual rise to the highest part of the lower edge of the mold-board, and has a circular shape, which forms a gradual rise to a right angle to the landside. The upper edge widens gradually until it hangs over the heel or bottom part six or eight inches. The mold-board is confined to the sheath by two rivets and by two to the stilt. The share is confined to the mold-board by a brace passing in front of the sheath through the wood or by this side of an iron beam which is fastened by a screw; also, a screw passing through near the edge of the mold-board and share. The head is confined by a screw to the stilt.

The beam is made of iron; is about six feet long, with a considerable curve, two inches and a half wide, and one and an eighth thick, which is large enough for three horses. The front end has holes to admit an open ring or clevis; also, a hole through the other end, where it comes into the stilt, which is confined by a rivet-pin. This beam is let into the top of the sheath, which is made of wood, and is confined by a cap of thin iron. The beam has a band of iron about five inches in front of the sheath, which is large enough on the under edge of the beam to admit a hook of one end of a brace which passes through the sheath and stilt near the heel of the plow, which is fastened by a screw. The stilts are made of wood, about five and a half feet long.

STEPHEN McCORMICK.

Witnesses:
WM. ELLIOT,
BENJN. FENWICK.